United States Patent [19]

Roovers

[11] Patent Number: 4,722,373
[45] Date of Patent: Feb. 2, 1988

[54] APPARATUS FOR PRODUCING AND FILLING BAG PACKAGES

[75] Inventor: Gijsbertus C. F. Roovers, Weert, Netherlands

[73] Assignee: Robert Bosch GmbH, Stuttgart, Fed. Rep. of Germany

[21] Appl. No.: 929,886

[22] Filed: Nov. 13, 1986

[30] Foreign Application Priority Data

Jan. 16, 1986 [DE] Fed. Rep. of Germany ....... 3601104

[51] Int. Cl.⁴ .............................................. B65B 3/04
[52] U.S. Cl. ...................................... 141/114; 53/451;
53/551; 53/248; 198/713; 198/716; 222/371
[58] Field of Search ................ 53/451, 551, 552, 248;
198/713, 714, 716; 141/10, 67, 68, 114,
313-317; 222/371

[56] References Cited

U.S. PATENT DOCUMENTS

| | | | |
|---|---|---|---|
| 568,691 | 9/1896 | Lekeux | 198/716 |
| 2,170,934 | 8/1939 | White | 198/716 |
| 2,340,783 | 2/1944 | Wegner | 198/716 |
| 3,403,817 | 10/1968 | Morash | 222/371 |
| 4,501,109 | 2/1985 | Monsees | 53/551 |

FOREIGN PATENT DOCUMENTS 2908225  9/1980  Fed. Rep. of Germany .

*Primary Examiner*—Houston S. Bell, Jr.
*Attorney, Agent, or Firm*—Edwin E. Greigg

[57] ABSTRACT

An apparatus for producing and filling tubular bag packages includes a shaping mandrel, about which a sheet of packaging material is shaped into a tube and an open end of the tube is filled with one portion of a product at a time and separated from the formed tube. For sending the portions of the product gently and quickly through the hollow shaping mandrel, a feed apparatus is disposed in the mandrel. The feed apparatus has a plurality of spaced flaps pivotably connected at equal intervals to two synchronous belt drives. In a feed conduit of the shaping mandrel, these flaps define downwardly moved chambers which receive portions of the product and transport them to the lower end of the shaping mandrel, and then, through a relatively narrow return conduit in the shaping mandrel, the flaps return upward again in an upright position by the belts.

12 Claims, 5 Drawing Figures

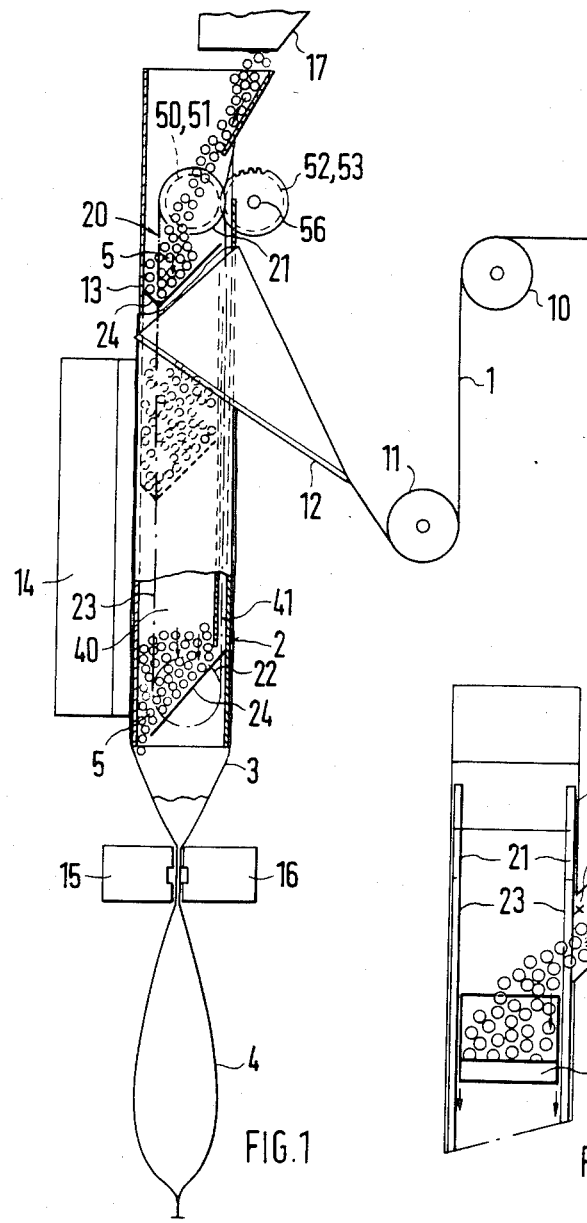
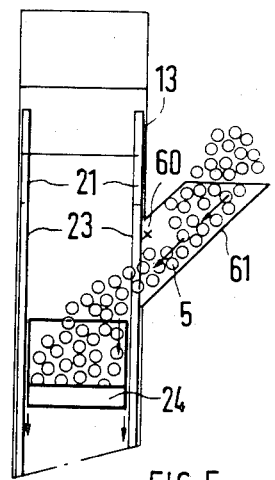
FIG. 1
FIG. 5

APPARATUS FOR PRODUCING AND FILLING BAG PACKAGES

BACKGROUND OF THE INVENTION

The invention is based on an apparatus for producing and filling bag packages. In an apparatus of this kind, known for instance from German Offenlegungstag No. 29 08 225 published Sept. 11, 1980, a feed container is movable up and down in a forming mandrel; in its upper position, a portion of the product to be packaged is introduced into the mandrel, and in its lower position, at the outlet of the shaping mandrel, this portion of the product is emptied into the thereby-formed bag end when the bottom of the mandrel is opened. In the known apparatus, although the height from which the product is poured out is very low because the product is moved inside the feed container, so that the product is gently handled as it is transferred into the package, still there is the disadvantage that the output of this apparatus is very low relative to the bag. Because of the feed container that is moved up and down in the shaping mandrel, the output is even lower than in a bag package making apparatus as set forth in European Pat. No. 57 768 issued on Nov. 21, 1984, in which the portions of the product to be filled are poured out through the entire height of the filling mandrel into an open end of the bag and thereupon drawn out lengthwise.

OBJECT AND SUMMARY OF THE INVENTION

The apparatus for producing bag packages according to the invention has the advantage over the prior art that even though a metered-out portion of the product is gently transferred through the shaping tube into the end of the tube from which a tubular bag package is shaped, nevertheless a very high output is attained. The movable walls partition off a plurality of downwardly moving chambers in the shaping tube, each receiving one portion of the product, so that with the portions following one another in close succession at relatively low speed, a high filling output is attained. Since the individual portions are furthermore compactly united in the chambers, in contrast to pouring the portions all the way through a shaping tube, the transfer time required for filling one chamber at the upper end of the shaping mandrel and emptying it at the lower end of the shaping mandrel is very short, because of the height from which the product has to drop.

A particular advantage is that the walls, which are pivotably connected to a pulling means, do not need a very wide conduit for their retraction in the shaping mandrel, so that a majority of the hollow space in the shaping mandrel is available to the feed conduit, for transferring the portions of the product.

If the walls are embodied of a flexible material, there is a further advantage that by bending the walls into a kind of V-shape, the walls assume a definitive blocking and sealing position under tension as they enter the feed conduit, and that as they emerge from the conduit they resume a flat shape, in which without requiring a large amount of space, they can be returned through the narrow return conduit to the reception point.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1, in simplified form, is a side view of a tubular bag making apparatus, seen partly in section;

FIG. 5 shows a further exemplary embodiment of the shaping mandrel in longitudinal section.

DESCRIPTION OF THE PREFERRED EMBODIMENT

Figures 2, 4:
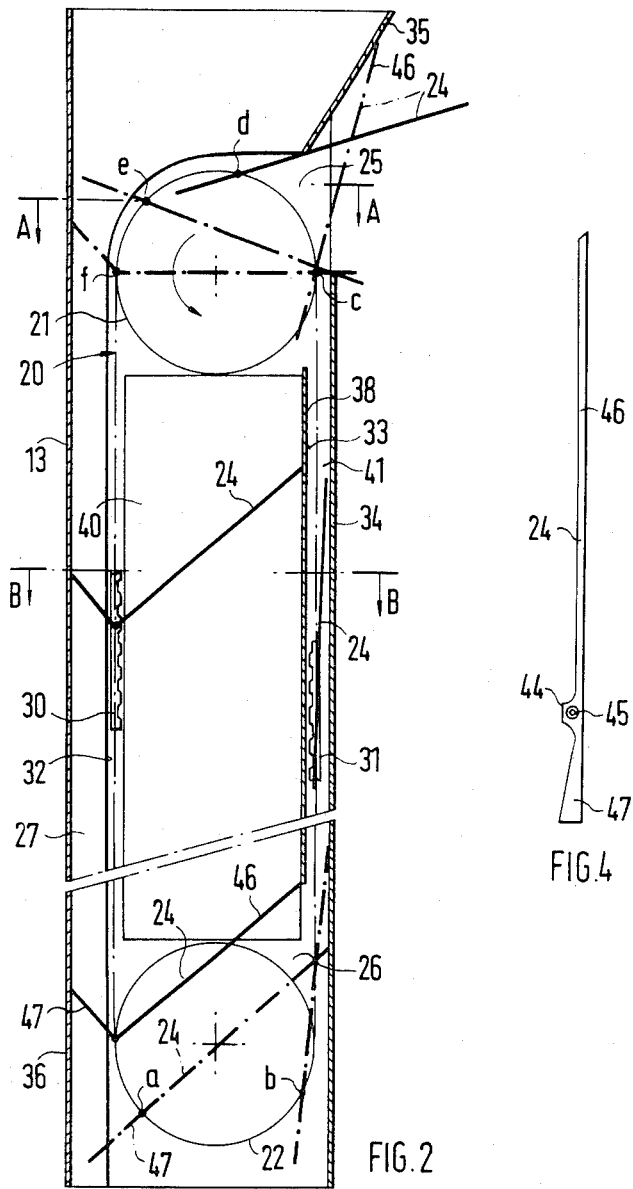
FIG. 2 shows a shaping mandrel of the tubular bag making apparatus of FIG. 1 in a longitudinal section.
FIG. 4 is a side view of a partition.

A sheet 1 of packaging material is unrolled from a supply roll, not shown, and guided via deflecting rollers 10, 11 about a shaping shoulder 12, which surrounds a shaping mandrel 13 and about this mandrel forms the sheet 1 into a tube 2. A longitudinal sealing jaw 14 associated with the shaping mandrel 13 heat-seals the two overlapping edges of the sheet 1 into a longitudinal seam, and a transverse pair of sealing jaws 15, 16 cuts off the end 3 of the tube that protrudes at the lower end of the shaping mandrel, after a portion of a product has been poured through the hollow shaping mandrel 13 into individual bag packages 4. The transverse pair of sealing jaws 15, 16 is movable up and down so as to advance the tube 2 on the shaping mandrel 13 by one bag length at a time; however, the advancement of the tube 2 may also be effected with conveyor belts associated with the shaping mandrel 13, which pull the tube 2 downward in increments of one bag length at a time.

Portions 5 of a product that is in pieces are metered out by weight or volume by a metering device. In order to guide these portions through the apparatus and into the pulled-down tube end 3 protruding from the lower end of the shaping mandrel, a feed apparatus 20 that holds a plurality of portions of the product at a time is disposed in the shaping mandrel 13.

The feed apparatus 20 has two synchronous belt drives extending parallel to one another, each comprising an upper and lower gear wheel 21, 22 and an endless toothed belt 23 guided over each pair of gear wheels, as well as flaps or walls 24 disposed between the two toothed belts 23 and arranged to be pivotable on them. The gear wheels 21, 22 are rotatably seated in recesses 25, 26 of the relatively thick side walls 27, 28 of the shaping mandrel 13, which has a rectangular box-like profile. The runs 30, 31 of the toothed belts 23 are each guided parallel between one gear wheel pair 21, 22 in grooves 32, 33 in the side walls 27, 28, which connect the two recesses 25, 26. The gear wheels 21, 22 are offset toward the right in the side walls 27, 28, so that the groove 33 for the right-hand run 31 of the toothed belts is located in the vicinity of the right-side limitation of the side walls 27, 28. This right limitation of the side walls 27, 28 is covered with a rear wall 34, which extends from the lower end of the shaping mandrel 13 as far as the height of the rotational axis of the upper gear wheel 21. Above the upper gear wheel 21, a rear wall portion 35 is disposed obliquely, so that its upper end emerges laterally to the back and its lower end protrudes partway between the two side walls 27, 28. The left-side limitation of the side walls 27, 28 is covered completely by a front wall 36. An intermediate wall 38 extends between the two gear wheels 21, 22 near the rear wall 34, dividing the hollow space in the shaping mandrel 13 into a wide feed conduit 40 and a narrow return conduit 41.

The flaps 24 are pivotably connected to both toothed belts 23 at equal intervals. The flaps 24 have a length that is equal to that of the feed conduit 40 in the hollow space in the shaping mandrel 13. However, their width is greater, preferably by one-third, than that of the feed conduit 40, so that the flaps 24 pulled into the feed conduit 40 are bent virtually into an L, with the angle of the L being located in the axis of the pivot points where the flaps 24 are connected to the toothed belts 23. The flaps 24 are of a flexible material and have a reinforcing rib 44 in the vicinity of the axis between the pivot points. At the ends of the rib 44, pins 45 are inserted, which engage bores in the toothed belts 23, and in particular in the vicinity of a tooth of the toothed belts 23. The thickness of the long wing 46 of a flap 24 beginning at the rib 44 increases to a lesser extent toward the edge than does the thickness of the other, shorter wing 47.

The flaps 24 introduced by the toothed belts 23 into the feed conduit 40 assume an L-shaped, groove-like form, since the width of the feed conduit 40 is less than the width of the flaps 24 in the feed conduit, and so act as a kind of bucket in a bucket conveyor. When after passing through the diversion path formed by the upper gear wheel they enter the feed conduit 40 and assume the above-described groove-like form being guided under tension by the front wall 36 and the intermediate wall 38 of the shaping mandrel 13, a portion 5 of the product is poured from the metering device 17 into the shaping mandrel 13, which is open at the top. The flap 24, forming a partition, receives this portion 5 of the product during its downward movement and transports the portion it to the lower end of the shaping mandrel 13. After passing through the straight stretch between the two gear wheels 21, 22, when the pivot axis of the flap 24 enters the diversion path of the lower gear wheel 22, the spacing between the pivot axis and the front wall 36 becomes greater, so that the bent flap 24 can relax, whereupon the upwardly bent shorter wing 47 of the flap 24 can snap downward because of the internal restoring force of the material. At this level, with its long wing 46, the flap 24 also reaches the lower end of the intermediate wall 38, so that this wing 46 can relax downward, as shown in solid line in FIG. 1 against the rear wall 34 of the shaping mandrel (position a as shown by the broken line in FIG. 2). The flap 24 returns to a position in which it is extended in one plane, whereupon the outer edge of the short wing 47 moves away from the front wall 36, so that the product portion that has been carried along with it can empty out downward through the resultant widening gap between the front wall 36 and the wing 47. In the course of this emptying process, the portion 5 of product carried along drops into the tube end 3 that closes off the lower opening of the shaping mandrel 13 and that is at the same time pulled downward by the transverse sealing jaws 15, 16 in order to form a new bag 4. Once the tube 4 has been advanced by one bag length, the two transverse sealing chucks 15, 16 move apart again and return upward into their initial position so that they can grasp the filled tube 2 once again.

During the passage through the lower deflection path, the flap 24, because of the weight of the long wing 46, rests with its outer edge on the inside of the rear wall 34, and with this same outer edge is threaded into the return conduit 41 between the rear wall 34 and the intermediate wall 38 upon entering from the deflection path into the straight stretch on the right between the two gear wheels 21, 22 (position b shown in FIG. 2). Upon further revolution of the toothed belts 23, the flap 24 passes through the return conduit 41, in the course of which its long wing 46 is in the lead and slides with its outer edge along the inside of the rear wall 34. At the level of the upper gear wheel 21, the flap 24 emerges from the return conduit 41, at which time the leading wing 46 protrudes out of the gap between the upper edge of the rear wall 34 and the rear wall portion 35 (position c see FIG. 2). In the ensuing passage through the upper deflection path formed by the gear wheel 21, the flap 24 is pivoted, so that the short wing 47 is in the lead (position d, e, FIG. 2). In so doing, the long wing 46 of the flap 24 meets the lower edge of the rear wall portion 35, whereupon the flap 24 is pivoted clockwise, and its long wing 46 meets the upper edge of the rear wall 34. In the transition from the deflection path into the ensuing straight stretch, the outer edge of the short wing 47 again comes into contact with the inside of the front wall 36, while at the same time the long wing 46, near its outer edge, rests on the upper edge of the rear wall 34. In this process, the two wings 46, 47 of the flap 24 are bent upward in V-shape like fashion (position f FIG. 2), so that the flap 24 is again put into a position where it can receive a new portion of the product.

The spacing between adjacent flaps 24 is dimensioned such that the spaces in the feed conduit 40 formed between two flaps have a volume that is greater than the volume of a portion 5 of product to be transferred. The toothed belts 23 with the flaps 24 are driven continuously, in synchronism with the metering device 17 and the transverse sealing chucks 15, 16.

Figure 3:
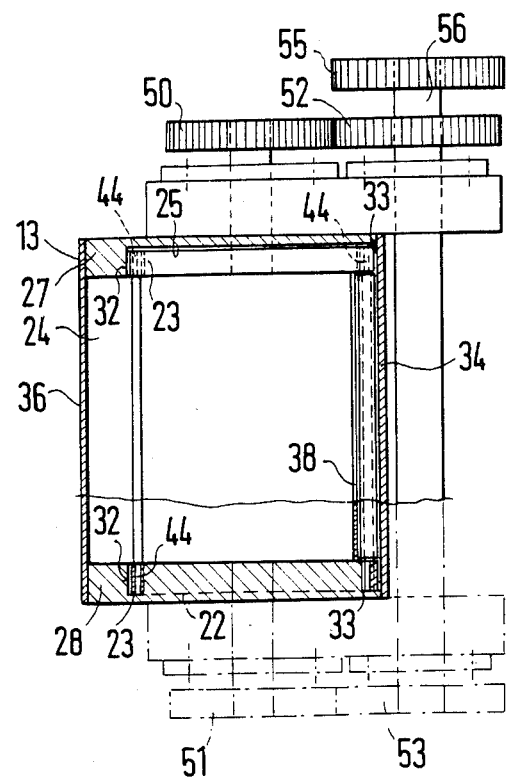
FIG. 3 shows the shaping mandrel of FIG. 2 in a cross section taken in the planes A—A and B—B of FIG. 2.

To drive the toothed belt drive in synchronism such that the axes of the flaps 24 assume a horizontal position, the upper gear wheels 21 are connected to gear wheels 50, 51 located outside the shaping mandrel 13, which mesh with gear wheels 52, 53 that are mounted on a common shaft 56 driven via a gear wheel 55, FIG. 3.

In the exemplary embodiment described above, the shaping mandrel 13 is embodied such that the portions 5 of the product can be poured from above into its upper opening. However, it is also possible, as shown in FIG. 5, for the shaping mandrel 13 to have an opening 60 below the upper gear wheels 21 in one of its side walls, with a receiving hopper 61 adjoining this opening 60 on the outside. This embodiment has the advantage that the product does not impact upon the upper gear wheels and the gaps surrounding them. In the above described exemplary embodiment the flaps are made of flexible material. However it is also conciebable of pivotable metal flaps with spring loaded action or constructions with use of plastics and metal to be used.

In the above-described exemplary embodiment, two endless toothed belts 23 are provided as tractive means for guiding the flaps 24 in an oval path. However, it is also conceivable for endless chains or endless belts to be used as tractive means. It is also possible to use other geometrical forms than a rectangular forms such as square or rounded.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for producing and filling bag packages, which comprises a shaping mandrel about which a sheet of packaging material is shaped to form a tube with a longitudinal seam which tube is separated into individual bags by the provision of transverse seams, a feed apparatus is disposed in the shaping mandrel for transferring measured portions of a product, introduced at the upper end of the shaping mandrel, into the prepared bag packages at the lower end of the shaping mandrel, in which said feed apparatus (20) includes an endless traction means (23), a plurality of equally spaced product carrying walls revolving on said endless traction means, said shaping mandrel (13) includes walls (36, 38), which encloses a feed conduit (40) and a return conduit (41), each having a different volume through which said endless traction means and said spaced product carrying walls are guided, wherein each spaced product carrying wall fills out a cross section of the feed conduit and feeds one portion (5) of the product at a time through the shaping tube into a formed bag.

2. An apparatus as defined by claim 1, in which said traction means are two parallel-guided toothed belts (23), which are guided about deflection wheels (21, 22) at the upper and lower end of the shaping mandrel (13).

3. An apparatus as defined by claim 2, in which said deflection wheels (21, 22) on the upper end of the shaping tube (13) are driven in common via a synchronization means.

4. An apparatus as defined by claim 1, in which said feed conduit (40) has a greater width than said return conduit (41), and that said equally spaced product carrying walls (24) are pivotably connected to the traction means (23) and pivoted at the transition from the return conduit to the feed conduit at the upper end of the traction means and from the feed conduit into the return conduit at the lower end of the traction means.

5. An apparatus as defined by claim 4, in which said traction means are two parallel-guided toothed belts (23), which are guided about deflection wheels (21, 22) at the upper and lower end of the shaping mandrel (13).

6. An apparatus as defined by claim 5, in which said deflection wheels (21, 22) on the upper end of the shaping tube (13) are driven in common via a synchronization shaft (56).

7. An apparatus as defined by claim 4, in which said product carrying walls are embodied in the form of flexible flaps (24) and have a width that is greater than a width of the feed conduit (40) of the shaping mandrel (13), such that upon being pulled through said feed conduit (40) the flaps assume a substantially V-shape like form, wherein their two edges defining the width, and slide under tension against the walls (36, 38) of the feed conduit that are in contact with them.

8. An apparatus as defined by claim 7, in which said traction means are two parallel-guided toothed belts (23), which are guided about deflection wheels (21, 11) at the upper and lower end of the shaping mandrel (13).

9. An apparatus as defined by claim 8, in which said deflection wheels (21, 11) on the upper end of the shaping tube (13) are driven in common via a synchronization shaft (56).

10. An apparatus as defined by claim 4, in which said flaps (24) are pivotably connected to the traction means (23) about an axis that is parallel to the center axis.

11. An apparatus as defined by claim 10, in which said traction means are two parallel-guided toothed belts (23), which are guided about deflection wheels (21, 22) at the upper and lower end of the shaping mandrel. (13).

12. An apparatus as defined by claim 11, in which said deflection wheels (21, 22) on the upper end of the shaping tube (13) are driven in common via a synchronization shaft (56).

* * * * *